United States Patent
Collard (10) Patent No.: US 11,666,009 B2
(45) Date of Patent: *Jun. 6, 2023

(54) LEAF STRIPPER

(71) Applicant: Etablissements Collard, Bouzy (FR)

(72) Inventor: Yannick Collard, Bouzy (FR)

(73) Assignee: Etablissements Collard, Bouzy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,195

(22) Filed: May 27, 2021

(65) Prior Publication Data

US 2021/0400886 A1 Dec. 30, 2021

(30) Foreign Application Priority Data

Jun. 24, 2020 (FR) ...................................... 2006587

(51) Int. Cl.
*A01G 3/00* (2006.01)
*A01G 17/02* (2006.01)
*A01G 3/08* (2006.01)

(52) U.S. Cl.
CPC ........... *A01G 17/026* (2013.01); *A01G 3/085* (2013.01)

(58) Field of Classification Search
CPC .......... A01G 17/026; A01G 3/00; A01G 3/08; A01G 3/085; A01B 41/04
USPC ......................................................... 47/1.43
See application file for complete search history.

(56) References Cited

U.S. PATENT DOCUMENTS

| | | | | |
|---|---|---|---|---|
| 4,027,733 A * | 6/1977 | Eisenhardt | ............. | A01D 47/00 171/58 |
| 5,544,444 A * | 8/1996 | Oldridge | ............... | A01G 3/0408 56/298 |
| 6,634,162 B1 * | 10/2003 | Andros | ................. | A01G 17/02 56/328.1 |
| 8,230,671 B2 * | 7/2012 | Pellenc | ................ | A01G 3/0408 56/235 |
| 9,049,820 B2 * | 6/2015 | Skipper | .................... | A01G 3/04 |
| 9,247,691 B2 * | 2/2016 | Andros | ................ | A01G 3/0408 |
| 11,310,966 B2 * | 4/2022 | Collard | .................. | A01B 41/04 |

(Continued)

FOREIGN PATENT DOCUMENTS

| | | |
|---|---|---|
| EP | 0898877 A1 | 3/1999 |
| EP | 2820940 * | 1/2015 |
| FR | 2289112 A1 | 5/1976 |

(Continued)

*Primary Examiner* — David J Parsley
(74) *Attorney, Agent, or Firm* — Harness, Dickey & Pierce, PLC (57) ABSTRACT

An agricultural leaf stripper which can adopt numerous configurations allowing leaf stripping of bushes and trees of varying shapes and sizes consists of a structure capable of being transported along a horizontal axis parallel to the ground and consisting of a structure formed of two parts one of which is fixed to the transporter vehicle and the other of which can slide vertically on the fixed part and supports a rectilinear rail generally parallel to the structure and able to be moved horizontally towards and away from the structure and tilted with respect thereto, the rail carrying at least two pneumatic leaf stripping heads, each stripping head being able to be set to a desired position on the rail independently of the other leaf stripping heads, and each being able to be set to a desired orientation about its working axis on the rail.

18 Claims, 7 Drawing Sheets

(56) References Cited

U.S. PATENT DOCUMENTS

2017/0156270 A1 6/2017 Borio et al.
2021/0144934 A1 5/2021 Collard et al.

FOREIGN PATENT DOCUMENTS

FR         3069131 A1   1/2019
WO   WO-2016-001864 A1   1/2016

* cited by examiner

LEAF STRIPPER

CROSS-REFERENCE TO RELATED APPLICATIONS

This application claims the benefit and priority of French patent application No. 2006587, filed Jun. 24, 2020, which is incorporated by reference herein.

TECHNICAL FIELD

The invention relates to the field of agricultural machinery. More particularly, the invention relates to a leaf stripper or defoliator of a practically universal type capable of being adapted to conventional means of transport and making it possible to strip the leaves of all types of vegetation due of its ability to adapt to the specific shape of the vegetation which is being stripped or defoliated.

BACKGROUND AND SUMMARY

In viticulture, removal of the leaves from vines is known. The purpose of this is to remove leaves that are hiding the bunches and to allow the sun to contribute to their ripening or to make bunches more visible and helping to greatly facilitate manual harvesting. Another function of leaf stripping is to provide better aeration of the vegetation, thereby reducing the development of diseases.

A stripping head can operate on any principle. According to one possible principle, leaf stripping is carried out pneumatically using a jet of air which is propelled, along a working axis, from a leaf stripping head towards the plant to be defoliated. Applicant's French patent FR 3,069,131 is an example of a stripping head. Vines have substantially identical shapes and sizes. Also, a vine leaf stripper conventionally comprises a support having a fixed shape, capable for example of "straddling" a row of vines, and carrying one or more stripping heads, as illustrated in FIG. 9 of applicant's French patent FR 3,069,131.

It has recently become evident that leaf stripping could be useful in the case of other plantations, whether these be bushes (currants, raspberries, etc.) or trees (apple trees, pear trees, etc.), or other trees, especially urban plantings. Different solutions can be found to solve these problems.

European patent EP 0,898,877 discloses a leaf stripper for vines, provided with cutting means and suction means comprising a housing for storing the waste produced. Such a machine is therefore firstly not designed for working at a certain height and secondly does not have the degrees of freedom that the leaf stripper according to the present invention has. The said patent mentions in the last line of the description that the machine described and claimed can also be used for partial stripping of any trellised vegetation as well as for trimming hedges, leafy trees, and conifers. The waste thus obtained is collected by suction in a housing. The subject matter of the present invention is neither the pruning of vegetation and wood waste, nor the partial pruning of leaves, nor the suction and storage of the waste formed. This leaf stripper has functions that are not those contemplated for the leaf stripper according to the invention.

A leaf stripper is also known having one single casing equipped with four fixed turnstile-shaped means, which therefore are neither adjustable nor orientable. Leaf strippers comprising two staggered heads are also known.

As the known stripping heads are quite adaptable to other vegetation, it is advantageous to provide a support capable of carrying one or more stripping heads that do not employ suction and whose configuration can be changed simultaneously to adapt to different sizes and/or shapes of vegetation and to offer various working angles, thus giving versatility to a user working on different types, sizes, or shapes of plantations, including tall trees. The aim of the invention is to provide such a leaf stripper which can readily be adapted to perform leaf stripping on a variety of sizes and shapes of plantations. The leaf stripper according to the invention has many degrees of freedom allowing it to adapt to all the configurations of the species of vegetation on which it is desired to practice defoliation.

To satisfy this aim, the invention provides an agricultural leaf stripper capable of being transported by transporter means in a horizontal direction of movement along an X axis substantially parallel to the ground, the said leaf stripper comprising in a first mode of realization of the invention:
- a single structure comprising a fixed part able to be secured at a lower end thereof to the transporter means and a movable part, the movable part being displaceable vertically with respect to the fixed part, and
- and one or two rails, a first and a second one and in case of comprising a single rail, the said rail carrying at least two stripping heads is supported by support means carried by the movable part of the structure, said rail being spaced from the structure and generally parallel thereto, the leaf stripper further comprising:
- a first linkage able to generate a vertical translatory movement PZ1, obtained by sliding the upper part of the structure relative to the fixed lower part of the structure along a generally vertical axis perpendicular to the horizontal direction of movement, thus perpendicular to plane XY,
- a second linkage able to generate a vertical translatory movement PZ2 of the rail relative to the support means carried by the movable part along a second axis Z2 generally perpendicular to the horizontal direction of movement, thus perpendicular to plane XY,
- a third linkage able to vary a spacing between the rail and the structure by generating a translatory movement PY of the rail relative to the structure in a direction generally perpendicular to the vertical axis direction thus parallel to plane XY,
- a fourth linkage able to generate a rotary movement RX of the rail about an axis generally perpendicular to the horizontal direction of movement, thus perpendicular to plane XY.

According to a second mode of realization or embodiment of the invention, the structure capable of being transported by the transporter means in a horizontal direction of movement along an axis substantially parallel to the ground, comprises:
- a fixed part able to be secured at a lower end thereof and
- a movable part, the movable part being displaceable vertically with respect to the fixed part, and
- two rails carrying each at least two stripping heads and supported by support means carried by the movable part of the structure, said rails being spaced from the structure and generally parallel thereto, each of the first and second rails, further comprising:
  - a first linkage able to generate a vertical translatory movement PZ1, obtained by sliding the upper part of the structure relative to the fixed lower part of the structure along a generally vertical axis perpendicular to the horizontal direction of movement, thus perpendicular to plane XY,
  - a second linkage able to generate a vertical translatory movement PZ2 of the rail relative to the support means carried by the movable part along a second axis Z2 generally perpendicular to the horizontal direction of movement, thus perpendicular to plane XY, a third linkage able to vary a spacing between the rail and the structure by generating a translatory movement PY of the rail relative to the structure in a direction generally perpendicular to the vertical axis direction thus parallel to plane XY, a fourth linkage able to generate a rotary movement RX of the rail about an axis generally perpendicular to the horizontal direction of movement, thus perpendicular to plane XY According to an embodiment, the at least two stripping heads are slidably mounted on the single rail and movable by a translatory movement along the rail with their working axes (T) being substantially perpendicular to an axis Z2 of the rail. According to a further embodiment, the at least two stripping heads are slidably mounted on the rail(s) and are movable by a translatory movement along the rail(s) with their working axes being substantially perpendicular to the plane XY. According to another further embodiment, at least one of the stripping heads has a degree of freedom allowing translatory movement thereof along the rail(s) independently of each one of the other stripping heads.

According to another further embodiment, at least one of the stripping heads further has a rotary degree of freedom relatively to the rail(s) about a working axis (T) thereof. According to a further other embodiment, the rail carrying the stripping heads further comprises at least one articulation about an axis substantially parallel to the horizontal X direction of movement making it possible to adapt the rail to a curved line or a broken line. According to a further embodiment, the first linkage able to generate a vertical translatory movement PZ1, by sliding the upper part of the structure relatively to the fixed lower part thereof, and the third linkage able to generate a translatory movement PY of the single rail relative to the structure are power-driven. According to a further embodiment, the first linkage able to generate a vertical translatory movement PZ1 and the third linkage able to generate a translatory movement PY of the rail relative to the structure are operated by an actuator.

According to another further embodiment the leaf stripper further comprises a pneumatic source capable of producing compressed air to be ejected by the leaf stripping heads and a system of pipes connecting the pneumatic source to each of the leaf stripping heads for supplying them with compressed air to be ejected by the stripping heads. According to a further another embodiment the leaf stripper further comprises in addition to the above structure and first single rail, a second identical rail, which can adopt a symmetrical position with the first rail so that leaf stripping can be performed at one and/or both sides of the transporter means. According to one embodiment the first rail and the second rail share one single common structure. The invention will be better understood on reading the following description, given purely by way of example, and with reference to the appended drawings.

DETAILED DESCRIPTION

Figure 1:
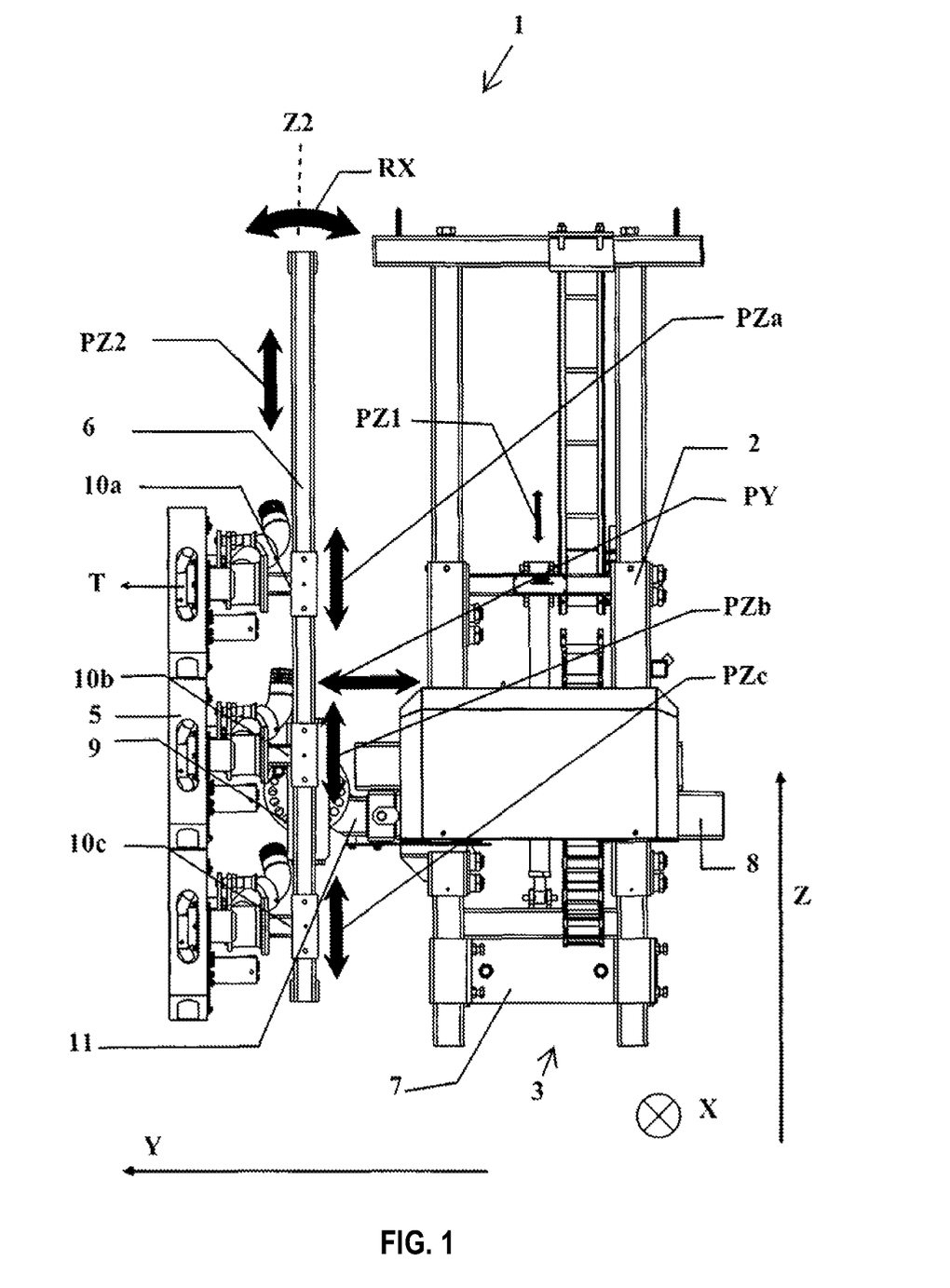
FIG. 1 shows, seen from the back, an embodiment of the invention in its most compact configuration.

Referring to FIG. 1, an agricultural leaf stripper 1 comprises a structure capable of being transported in a horizontal direction of movement along a horizontal axis X substantially parallel to the ground. This structure comprises a structure 3 and comprises a substantially rectilinear rail 6 having a second axis Z2 which is generally perpendicular to horizontal axis X and to plan e XY.

At least two stripping heads 5 are secured onto rail 6. They are secured in such a way that their working axis T is substantially parallel to horizontal axis X and perpendicular to the second axis Z2. Working axis T is the direction in which compressed air is blown for pneumatic stripping heads 5, i.e., a direction substantially normal to the foliage to be treated.

According to an important feature of the invention, the stripping heads 5 are secured to rail 6 in such a way that the position of each of them can be varied independently of each of the others. This advantageously makes it possible to adapt the positioning of the stripping heads 5, and therefore the height and density of stripping, to the height and density of the foliage.

Figure 2:
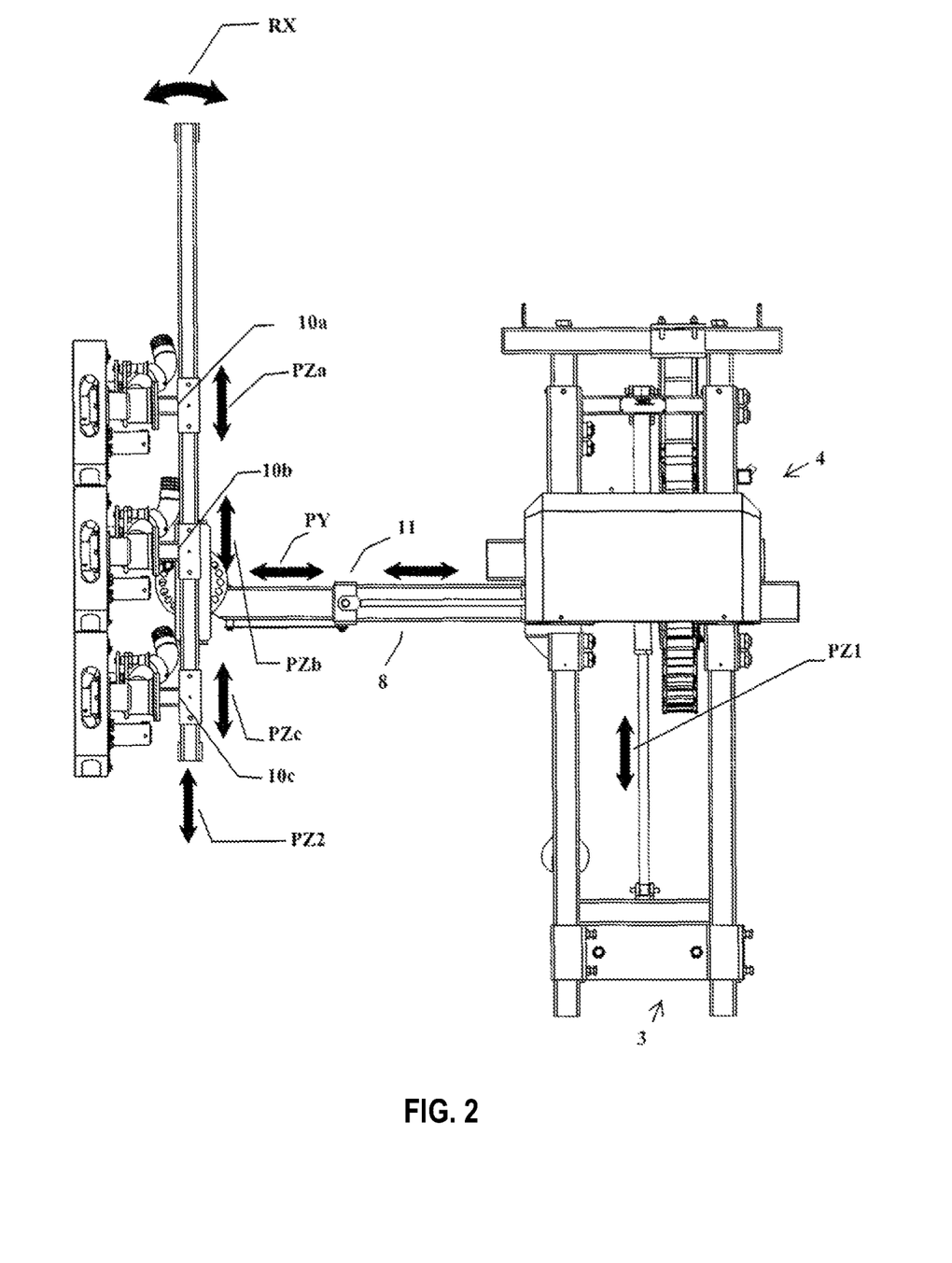
FIG. 2 shows the embodiment of FIG. 1 in a deployed configuration.
Figure 5:
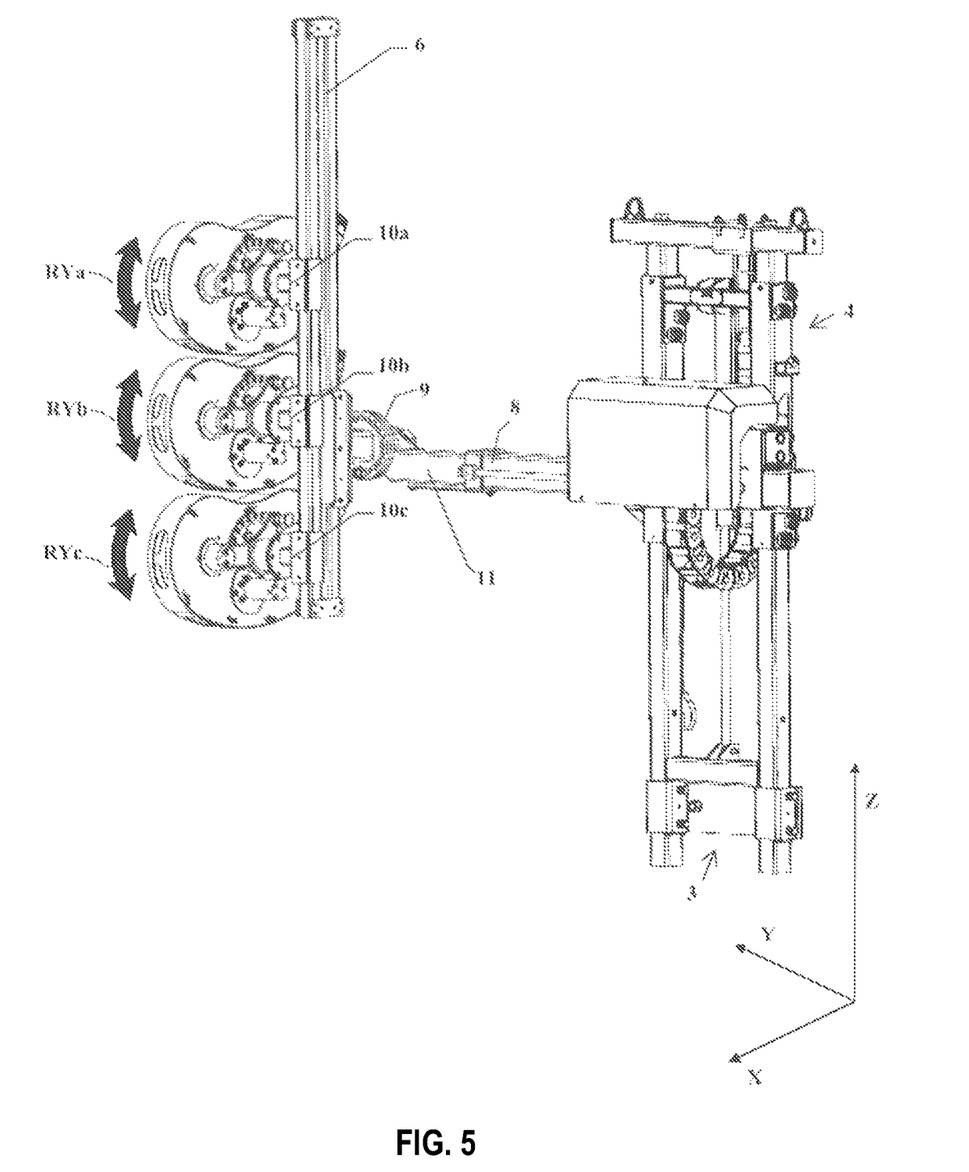
FIG. 5 shows the embodiment of FIG. 1, illustrating a deployed configuration and another positioning of the stripping heads.

According to another feature, in order to individualize their position, each of the leaf stripping heads 5 is mounted in such a way as to allow translatory movement consisting of a translatory movement PZa, PZb, PZc along rail 6, independently of each of the other leaf stripping heads 5. As shown in FIGS. 1, 2 and 5, each of the three leaf stripping heads 5 comprises, at the level of its support 10a-c, a means able to generate a translatory movement along rail 6. This makes it possible to bring two leaf stripping heads 5 closer together to densify leaf stripping over a smaller height or, on the contrary, to move two leaf stripping heads 5 further apart so as to increase leaf stripping height to the detriment of stripping density.

The stripping head 5 used to illustrate the invention, developed by the applicant, comprises two air ejection modules arranged side by side and having substantially parallel axes of air ejection or working axes T. Additionally, it is possible to modify the intensity of leaf stripping by modifying the orientation of a leaf stripping head 5 about its working axis T. As more particularly illustrated in FIG. 3, the highest leaf stripping head 5a is arranged vertically. It thus offers increased stripping height at the expense of reduced stripping density. The middle stripping head 5b is arranged horizontally. It thus offers reduced stripping height for an increased stripping density. The lowest stripping head 5c is arranged in an intermediate orientation. It thus offers a compromise, with average stripping height and average stripping density.

Figure 4:
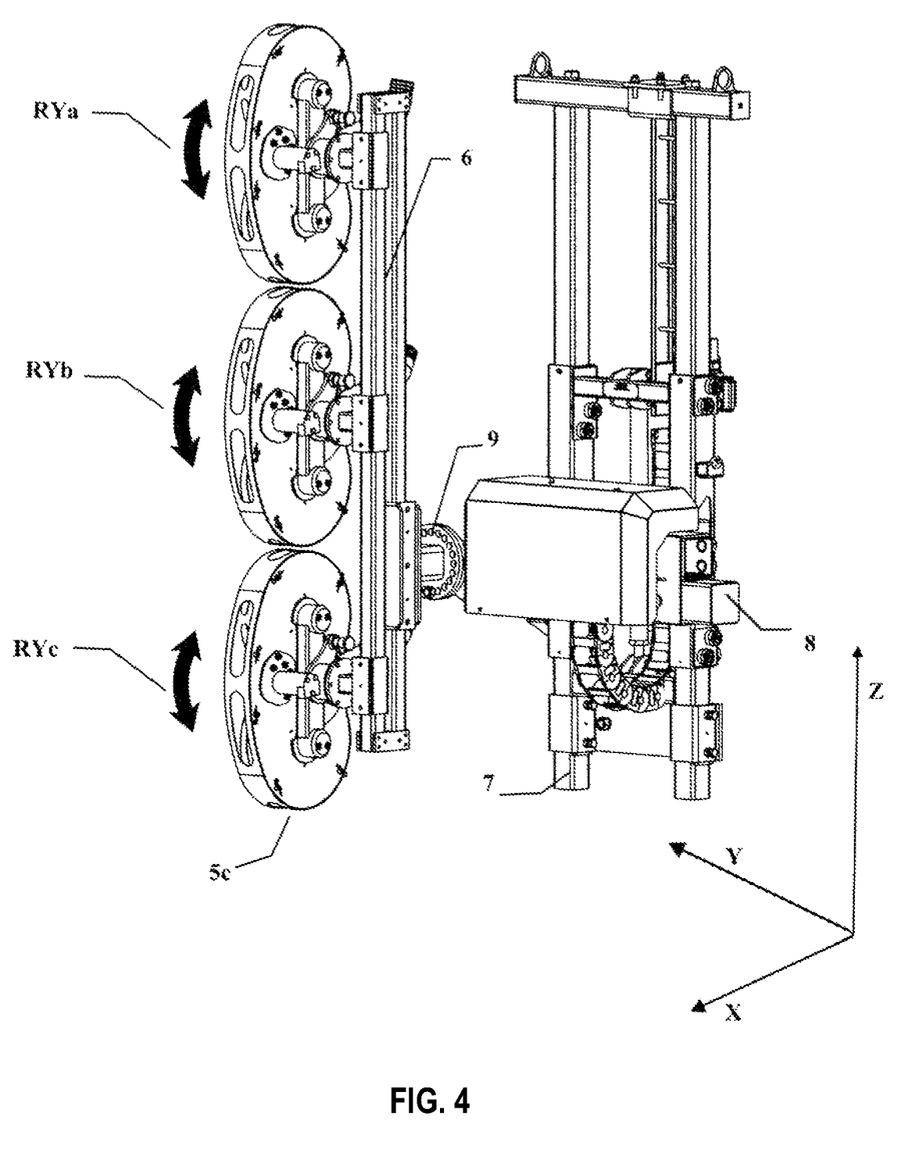
FIG. 4 shows the embodiment of FIG. 1, illustrating its most compact configuration and showing a first positioning of the stripping heads.

Also, according to another feature, at least one, preferably each, of the leaf stripping heads 5 has a further rotary degree of freedom RYa, RYb, RYc, relative to rail 6, about working axis T, as best seen in FIG. 5. Mounting them in this way allowing a rotary degree of freedom RYa, RYb, RYc makes it possible to modify the orientation of each one of the stripping heads 5a-c independently of each of the others to modify height and/or density of leaf stripping. The combination of the degrees of freedom consisting of a translatory movement PZa, PZb, PZc and/or a rotary movement RYa, RYb, RYc, allows the stripping heads 5a-c to adopt varying configurations, thereby varying leaf stripping density and/or height. FIGS. 4 and 5 show two examples of such configurations.

According to another feature, rail 6, carrying the stripping heads 5 further comprises at least one articulation about an axis substantially parallel to horizontal axis X. This makes it possible to make the rail 6 conform to an interrupted line. Depending on the number of articulations, rail 6 can adopt a V, L, C, M, W, or other shape, so that to match with the shape of the tree or bush to be stripped as closely as possible. This is particularly advantageous in the case of a non-longitudinal shape, which may be the case, for example, for fruit trees, depending on their natural shape or their size. Rail 6 is carried by a structure 3. This structure 3 comprises a cadre 4 with a fixed proximal end or fixed part 7 and a movable distal end or movable part 2. Structure 3 can be fixed at its fixed proximal end 7 to a transporter means (not shown), for transporting it along the first horizontal axis X. This is the axis of advance of the movable transporter means, which is substantially parallel to a row of bushes or the like to be stripped. The transporter means can be an agricultural vehicle, such as a tractor or a trailer pulled by a tractor or any other equivalent means. Structure 3 is transported by the movable transporter vehicle and itself supports rail 6, integral with the movable distal end 2 or movable part of cadre 4.

Structure 3 is deformable by means of one or more linkages. This makes it possible to shift the position, with a single movement, of rail 6 and all the stripping heads 5a-c carried by the latter. The actual architecture of this structure 3 can be arbitrary. The following description illustrates a possible example of structure 3.

Structure 3 can be extended or retracted vertically like an arm. By anatomical analogy, its fixed proximal end 7 is the one closest to the transporter vehicle, while movable distal end 2 is the one farthest from the transporter vehicle. In order to be able to bring rail 6 and the stripping heads 5a-c that it carries close to a row of vegetation, and to be able to adapt to a row of bushes such as vine or currant bushes, etc., or to a row of trees such as apple trees, pear trees, etc. of size, volume and shape which may vary, structure 3 is deformable. This deformation is made possible by means for adjustment arranged between fixed proximal end 7 and a movable distal end 2.

Referring to FIG. 1, a first means for adjustment is constituted by a first linkage able to generate a vertical translatory movement PZ1. This linkage is between a frame comprising a fixed proximal end 2, movable distal end, secured to the transporter vehicle and the more distal portion 2 of structure 3, see also FIGS. 2 and 5. It allows a translatory movement substantially along a vertical axis Z. This vertical axis Z is perpendicular to the X axis of advancement over the ground and to a second axis Y, horizontal and perpendicular to first X axis, and consequently perpendicular to the XZ plane. As also seen in FIG. 5, a beam 8 forming support means for the rail can be driven relative to the frame with a translatory movement along axis Z, the beam carrying with it rail 6, stripping heads 5, a variable tilting means 9, and a sliding linkage 11 associated with the movable distal end of structure 3.

A third means for adjustment is constituted by a third linkage able to generate a translatory movement PY, see in particular FIGS. 1 and 2, along second axis Y, for moving rail 6 relative to structure 3. According to one feature, beam 8 is horizontal and comprises a sliding linkage 11 which can extend substantially parallel to beam 8. Sliding linkage 11 is movable with a translatory movement along second axis Y and varies the spacing of rail 6 as well as the parts it supports relative to the structure 3.

A fourth optional means for adjustment consists of a fourth linkage allowing a rotary degree of freedom RX about an axis substantially perpendicular to first axis X. A variable tilting means 9, see in particular FIG. 5, implements the fourth linkage providing a rotary degree of freedom RX, allowing a certain degree of tilting about an axis substantially perpendicular to first axis X of parts supported by rail 6, with respect to structure 3.

Figure 3:
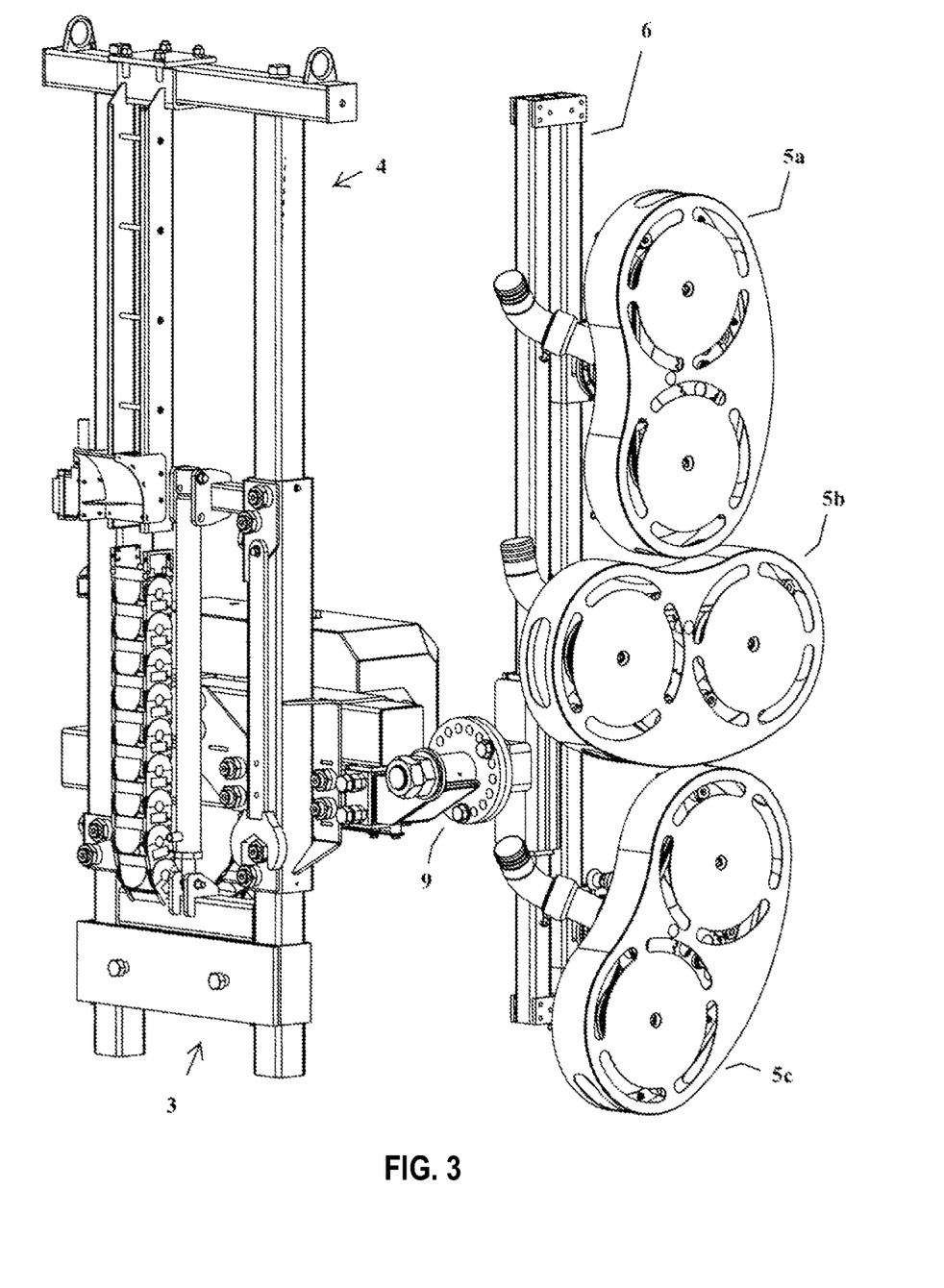
FIG. 3 shows the embodiment of FIG. 1, in a three-quarter front view and illustrating different orientations of the stripping heads.

According to one embodiment, the fourth linkage allowing a rotary degree of freedom RX comprises abutting flanges, able to be rotated one with respect to the other and to be locked together at varying mutual orientations. As illustrated in FIG. 3, the fourth linkage comprises two facing circular flanges, carrying holes arranged on the same circumference making it possible to define and maintain a given orientation by means of at least one through screw securing the two flanges together, or alternatively using a variable screw drive or by means of manual intervention.

A second means for adjustment is constituted by a second linkage able to generate a translatory movement PZ2 substantially along a second axis Z2. This axis Z2, which is the axis of rail 6, is generally perpendicular to the X axis. Due to it being able to tilt as a result of rotary degree of freedom RX, its orientation can vary in a plane Y-Z. Its default position, as shown in the drawings is substantially vertical, thus substantially parallel to vertical axis Z and perpendicular to axis X. The second means for adjustment can vary the position of rail 6 together with the parts carried thereon relative to structure 3 in direction PZ2 along axis Z2, in both directions. It thus can adjust the position of all the leaf stripping heads 5a-c with a coordinated or differentiated movement.

FIG. 1 illustrates a configuration of structure 3 at the lowest position of degree of freedom PZ1, with degree of freedom PY producing its most compact position, and the fourth linkage allowing rotation RX set so that the axis Z2 of rail 6, coincides with the Z axis. FIG. 2 illustrates another configuration of structure 3 at the highest position of movement PZ1, with degree of freedom PY producing its most extended position, and the fourth linkage allowing rotation RX so that the axis Z2 of rail 6, coincides with the axis Z and is perpendicular to axis X.

It goes without saying that each of the linkages can be driven to adapt a position along one of the degrees of freedom independently of the others. Due to the way structure 3 is organized, a displacement of any one of the linkages influences the position of all the components supported by rail 6. All linkages have been described above as mechanical. The person skilled in the art knows how to implement components making it possible to produce a linkage able to generate a translatory movement or a linkage able to generate a rotary movement.

It is possible to perform, independently for each linkage, manual adjustment on leaf stripper 1 while it is stationary, once per row or per type of plantation. It is also possible, independently for each linkage, to use a power-driven linkage, driven by any means. Adjusting motor-driven linkages advantageously makes it possible to modify the configuration of structure 3 more easily, including while leaf stripper 1 is moving, and including from the vehicle carrying it, in order to adapt the positioning of the at least one stripping head relative to the vegetation. According to a preferred feature, as illustrated in FIGS. 1-5, the first linkage able to generate a translatory movement PZ1 and the second sliding linkage PY are power-driven, preferably by an actuator.

Figure 1A:
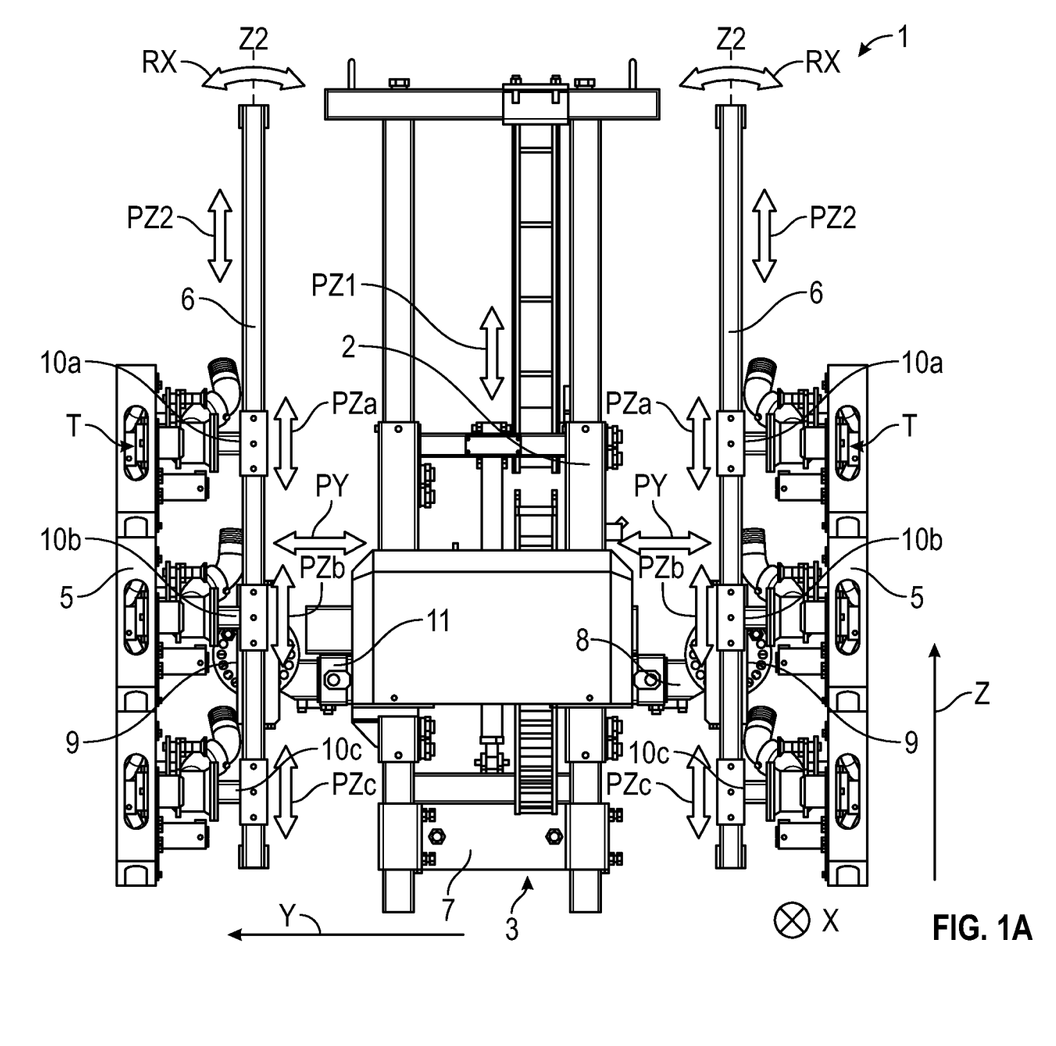
FIG. 1A shows, seen from the back, an example of a two rail system in its most compact configuration.
Figure 2A:
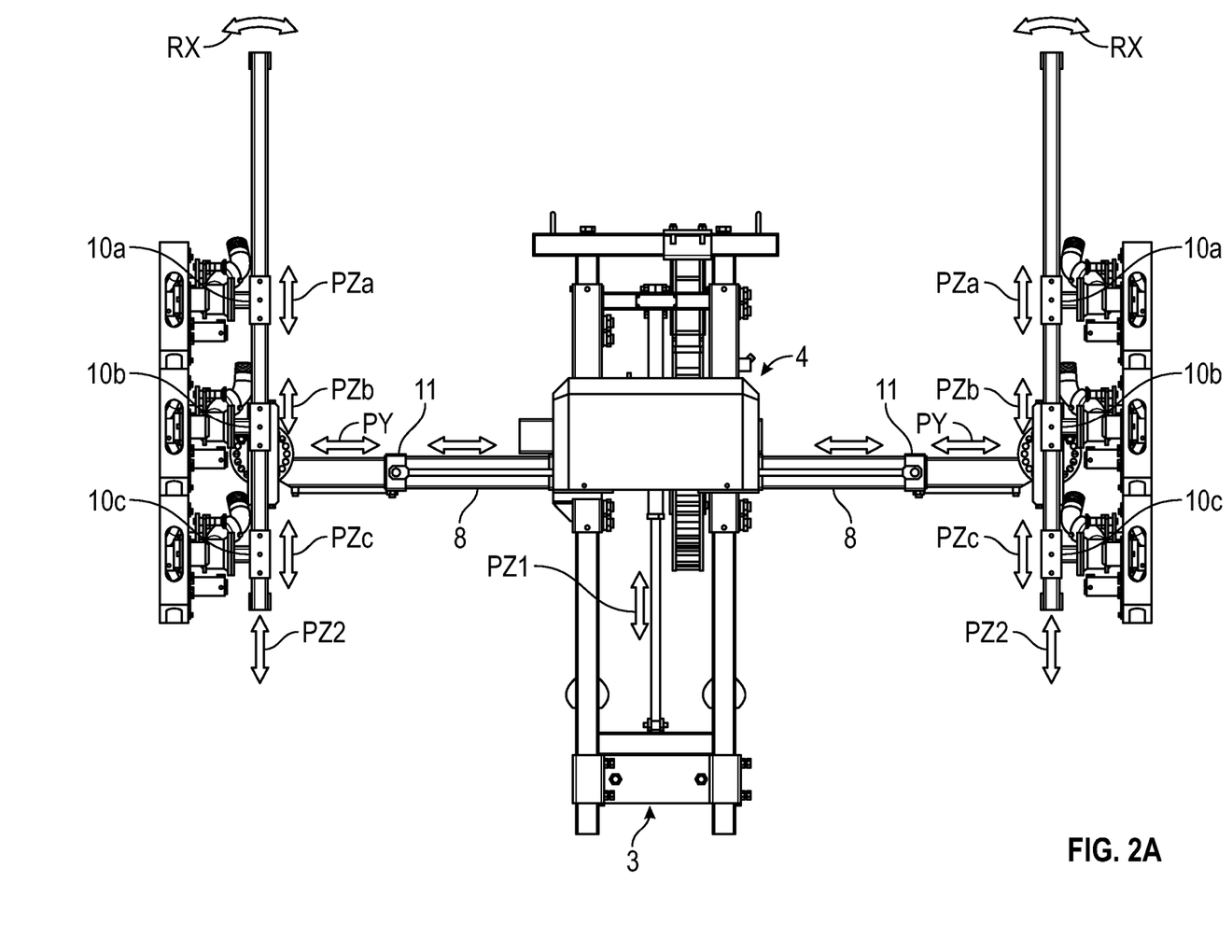
FIG. 2A is the example of FIG. 1A shown in a deployed configuration.

According to another feature as illustrated in FIGS. 1A and 2A, leaf stripper 1 can further comprise a second structure, substantially symmetrical with the first structure relative to a plane containing the X axis and vertical axis Z. Thus, such a leaf stripper 1 has at least one stripping head 5 carried by structure 3, in order to perform leaf stripping at one side, for example towards the left in FIGS. 1 and 2, and has at least one stripping head 5 carried by the second structure, in order to perform leaf stripping at the other side, or to the right in FIGS. 1A and 2A. Such a feature advantageously makes it possible, in a single pass, for the transporter vehicle to simultaneously strip two neighboring rows of vegetation. Here, the third linkage generating an essentially horizontal translatory movement PY in each structure makes it possible to adapt the leaf stripper 1 to the distance between the two rows of vegetation. The two structures can be completely independent.

Advantageously, according to another feature, the first structure and the second structure share a common structure 3 and a single first linkage able to generate a translatory movement PZ1. In this case, there is a single structure 3 and thus a single frame and a single horizontal beam 8. Said horizontal bean comprises two sliding linkages 11 one at each of its ends. Thus, structure 3 comprises one linkage able to generate a translatory movement PY of its rail extending along second axis Y starting from the movable part 2 of the structure 3 and directed to one side, for example the left side, and the second rail, if present, comprises another linkage able to generate a translatory movement PY of its rail along second axis Y starting from the movable part of the structure in the opposite direction, thus right hand side.

Stripping heads 5a-c should be supplied with energy to enable them to perform their stripping function. In the case of pneumatic stripper heads 5 as illustrated, leaf stripper 1 further includes a pneumatic supply (not shown). This pneumatic supply is suitable for producing compressed air. It comprises a certain number of pipes (not shown) connecting a compressed air generator to each of the at least one stripping head 5a-c in order to distribute compressed air.

This pneumatic supply can be mounted on structure 3, carried by the transporter vehicle or even by a trailer hitched to the transporter vehicle. Advantageously, this pneumatic supply takes its energy from a power take-off of the transporter vehicle. The capacity of the pneumatic supply is configurable to suit the desired stripping power and the number of stripping heads 5.

Any number of stripping heads 5 can be employed. For vegetation of limited height to be stripped, a single stripping head 5 may be sufficient. The drawings show a configuration with three stripping heads 5a-c. Ten or more stripping heads 5a-c can be used depending on the height to be stripped and the desired stripping density. The length of rail 6 is adapted accordingly.

The invention has been illustrated and described in detail in the drawings and the foregoing description. This should be considered as illustrative and given by way of example and not as limiting the invention to this description alone. Many variant embodiments are possible.

LIST OF REFERENCE SIGNS

1: leaf stripper,
2: movable distal end,
3: structure,
4: cadre
5: stripping head,
6: rail,
7: fixed proximal end
8: beam,
9: variable tilting means,
10a-c: supports,
11: sliding linkage,
X, Y, Z, Z2: axes,
PZ1: first linkage able to generate a translatory movement,
PZ2: second linkage able to generate a translatory movement,
PY: third linkage able to generate a translatory movement,
RX: fourth linkage allowing rotation,
PZa, PZb, PZc: linkage able to generate a translatory movement
RYa, RYb, RYc: linkage allowing rotation,
T: stripping head axis.

What is claimed is:

1. An agricultural leaf stripper, including a ground structure transportable by a transporter in a horizontal direction of movement along an axis (X) substantially parallel to an XY plane of the ground structure, the agricultural leaf stripper comprising:
 a lower fixed part secured at a lower end thereof to said transporter;
 a movable part displaceable vertically with respect to said lower fixed part;
 only one or two rails carrying at least two leaf stripping heads and supported by a support carried by said movable part, said one or two rails spaced from said ground structure and generally parallel thereto;
 a first linkage generating a vertical translatory movement PZ1 obtained by sliding an upper part of the ground structure relative to the lower fixed part along a generally vertical axis perpendicular to the horizontal direction of movement and perpendicular to the XY plane;
 a second linkage generating a vertical translatory movement PZ2 of the only one or two rails relative to the support carried by the movable part along a second axis Z2 generally perpendicular to the horizontal direction of movement and perpendicular to plane XY;
 a third linkage varying a spacing between the only one or two rails and the ground structure by generating a translatory movement PY of the one or two relative to the ground structure in a generally perpendicular direction to the vertical axis and parallel to plane XY,
 a fourth linkage generating a rotary movement RX of the one or two about an axis generally perpendicular to the horizontal direction of movement and perpendicular to plane XY;
 a pneumatic source producing compressed air ejected by the leaf stripping heads; and
 a system of pipes connecting the pneumatic source to each of the leaf stripping heads and communicating the compressed air thereto, wherein axes of the first linkage, the second linkage, the third linkage and the fourth linkage, and the horizontal direction of movement of the transporter being parallel or orthogonal.

2. The agricultural leaf stripper of claim 1, wherein the only one or two rails comprises two rails comprising a first rail and a second rail, said second rail allowing stripping on both sides of the said ground structure in a horizontal direction of movement along the axis (X) substantially parallel to a ground, the second rail in a symmetrical position with respect to the first rail comprising the at least two stripping heads supported by the support carried by the movable part of the ground structure and the first rail and the second rail being spaced from and generally parallel thereto.

3. The agricultural leaf stripper of claim 2, wherein the first rail and the second rail form a single assembly with a common structure.

4. The agricultural leaf stripper according to claim 2, wherein at least two leaf stripping heads are slidingly mounted on the first rail, the second rail or both and are movable by a translatory movement along the first rail, the second rail or both, wherein the at least two leaf stripping heads comprise work axes (T) being substantially perpendicular to the second axis Z2.

5. The agricultural leaf stripper according claim 2, wherein at least one of the at least two stripping heads has a degree of freedom allowing a translational movement (PZa, PZb, PZc) along the first rail, the second rail or both independently of another of the at least two stripping heads.

6. The agricultural leaf stripper according to claim 2, wherein at least one of the at least two leaf stripping heads also has a degree of freedom allowing a rotating movement (RYa, RYb, RYc) with respect to a work axis (T).

7. The agricultural leaf stripper according to claim 1 wherein the only one or two rails further comprises at least one articulation around an axis substantially parallel to said horizontal direction of displacement (X), adapting a first rail, a second rail or both to a curved line or a broken line.

8. The agricultural leaf stripper according to claim 2, wherein said first linkage and said third linkage are motorized.

9. The agricultural leaf stripper according to claim 2, wherein said first linkage and said third linkage are actuated by an actuator.

10. The agricultural leaf stripper according to claim 2, further comprising a single means of support consisting of the structure supporting the first rail and the second rail and further comprising two sliding connections, each varying an interval between each of the first rail and the second rail, and said ground structure.

11. The agricultural leaf stripper of claim 1, wherein the only one or two rails comprise two rails comprising a first rail and a second rail forming a single assembly with a common structure.

12. The agricultural leaf stripper according to claim 1, wherein the at least two stripping heads are slidingly mounted on a first rail or a second rail of the only one or two rails and are movable by a translatory movement along the first rail, the second rail or both, wherein the at least two stripping heads comprise work axes (T) being substantially perpendicular to the second axis Z2.

13. The agricultural leaf stripper according claim 1, wherein at least one of the at least two stripping heads has a degree of freedom allowing a translational movement (PZa, PZb, PZc) along a first rail, a second rail or both independently of another of the at least two stripping heads.

14. The agricultural leaf stripper according to claim 1, wherein at least one of the at least two leaf stripping heads also has a degree of freedom allowing a rotating movement (RYa, RYb, RYc) with respect to a work axis (T).

15. The agricultural leaf stripper according to claim 1 wherein the only one or two rails further comprises at least one articulation around an axis substantially parallel to said horizontal direction of displacement (X) for adapting a first rail, a second rail or both of the only one or two rails to a curved line or a broken line.

16. The agricultural leaf stripper according to claim 1, wherein said first linkage and said third linkage are motorized.

17. The agricultural leaf stripper according to claim 1, wherein said first linkage and said third linkage are actuated by an actuator.

18. The agricultural leaf stripper according to claim 1, further comprising a single means of support consisting of the structure supporting a first rail or a second rail of the only one or two rails and further comprising two sliding connections, each varying an interval between each of the first rail and the second rail, and said ground structure.

\* \* \* \* \*